(12) United States Patent
Ogata

(10) Patent No.: US 6,710,766 B1
(45) Date of Patent: Mar. 23, 2004

(54) MANUAL CONTROLLER

(75) Inventor: Hiroki Ogata, Tokyo (JP)

(73) Assignee: Sony Computer Entertainment Inc. (JP)

( * ) Notice: Subject to any disclaimer, the term of this patent is extended or adjusted under 35 U.S.C. 154(b) by 104 days.

(21) Appl. No.: 09/706,424

(22) Filed: Nov. 3, 2000

(30) Foreign Application Priority Data

Nov. 12, 1999 (JP) ............................................. 11-323008

(51) Int. Cl.[7] .............................. G09G 5/00; G06F 17/00
(52) U.S. Cl. ........................ 345/156; 345/169; 463/36; 463/37; 463/38
(58) Field of Search ................................ 345/169, 173, 345/166, 163, 156, 157; 463/37, 36, 38; 200/305; 600/121; 273/148 B; 136/243

(56) References Cited

U.S. PATENT DOCUMENTS

| 4,396,830 | A | * | 8/1983 | Isozaki et al. .......... 235/145 R |
| 5,189,110 | A | | 2/1993 | Ikematu et al. ............. 525/314 |
| 5,231,237 | A | * | 7/1993 | Cupp ........................ 42/71.02 |
| 5,310,376 | A | * | 5/1994 | Mayuzumi et al. ......... 446/107 |
| 5,329,935 | A | * | 7/1994 | Takahashi ................... 600/121 |
| 5,853,326 | A | * | 12/1998 | Goto et al. .................. 345/169 |
| 5,919,092 | A | * | 7/1999 | Yokoi et al. .................. 463/37 |
| 6,001,014 | A | * | 12/1999 | Ogata et al. ................. 463/37 |
| 6,010,406 | A | * | 1/2000 | Kajikawa et al. ............. 463/37 |
| 6,153,843 | A | * | 11/2000 | Date et al. .................. 200/339 |
| 6,219,038 | B1 | * | 4/2001 | Cho .......................... 200/305 |
| 6,241,247 | B1 | * | 6/2001 | Sternberg et al. ......... 273/148 B |
| 6,268,559 | B1 | * | 7/2001 | Yamawaki .................. 136/243 |
| 6,461,242 | B2 | * | 10/2002 | Takeda et al. ................ 463/38 |

FOREIGN PATENT DOCUMENTS

| JP | 401188323 A | * | 7/1989 | ................. 264/205 |
| JP | 402270519 A | * | 11/1990 | ................. 264/205 |
| JP | 07285084 | | 10/1995 | |
| TW | 369431 | | 9/1999 | |
| WO | WO 99/36136 | | 7/1999 | |

* cited by examiner

Primary Examiner—Vijay Shankar
Assistant Examiner—Prabodh Dharia
(74) Attorney, Agent, or Firm—Lerner, David, Littenberg, Krumholz & Mentlik, LLP

(57) ABSTRACT

A manual controller has a main body and a pair of grips detachably mounted on the main body. The grips are made of a shape memory synthetic resin and can be deformed into a shape which is complementary to the palms of the user of the manual controller.

9 Claims, 20 Drawing Sheets

MANUAL CONTROLLER

BACKGROUND OF THE INVENTION

1. Field of the Invention

The present invention relates to a manual controller, and more particularly to a manual controller for use with an entertainment apparatus and a mouse device for use with a general-purpose computer such as a personal computer or the like.

2. Description of the Related Art

Entertainment apparatus for downloading a game program from a mass storage medium such as a CD-ROM as an optical disk to play a game or reproducing music from a CD have a manual controller which is manipulated by the user, i.e., the game player, to control the entertainment apparatus.

The manual controller comprises a control section having a plurality of buttons which the user presses to enter commands and grips that are gripped by the user when the user uses the manual controller.

A mouse device is usually connected to a general-purpose computer such as a personal computer or the like for operating the general-purpose computer.

The mouse device comprises a casing which houses position sensors therein and which is held by the user, and a plurality of buttons which the user presses to enter commands.

The grips of the manual controller and the casing of the mouse device, which are gripped by the user, and the buttons, which are pressed by the user, are ergonomically shaped to allow the user to operate the manual controller and the mouse device effectively without fatigue.

The manual controller and the mouse device are used by a wide range of users including male, female, child, and adult users. However, it is difficult to shape the grips, the casing, and the buttons to fit the shapes of hands and fingers of all kinds of users.

SUMMARY OF THE INVENTION

It is therefore an object of the present invention to provide a manual controller having grips and a control section which can fit the shapes of hands and fingers of all kinds of possible users.

According to the present invention, there is provided a manual controller for connection to an apparatus for executing a program, for outputting information to the apparatus, comprising a grip, the grip including at least a portion made of a shape memory synthetic resin. The grip may be deformed into a desired shape to allow the user to operate the manual controller easily.

The manual controller may be used as a manual controller for an entertainment apparatus, and the grip may comprise a pair of grips of the manual controller. By deforming the grips into a desired shape, the user can operate the manual controller for the entertainment apparatus with ease.

The manual controller may have a main body, and the grips may be detachably mounted on the main body. The grips detached from the main body can easily be deformed by being dipped in hot water.

The grips may have a portion detachably mounted on the main body, and the portion may be made of a synthetic resin other than the shape memory synthetic resin. Since the portion of the grip detachably mounted on the main body is not deformed, the grip can reliably be mounted on the main body.

The manual controller may be used as a mouse device, and the grip may comprise a casing of the mouse device. The casing may be deformed into a desired shape to allow the user to operate the mouse device easily.

The mouse device may include a main body, and the casing may be detachably mounted on the main body. The casing detached from the main body can easily be deformed by being dipped in hot water.

The casing may have a portion detachably mounted on the main body, and the portion may be made of a synthetic resin other than the shape memory synthetic resin. Since the portion of the casing detachably mounted on the main body is not deformed, the casing can reliably be mounted on the main body.

The portion of the grip may comprise a portion to be pressed by a finger of the user of the manual controller, and the portion may be made of the shape memory synthetic resin. Because the portion to be pressed by the finger of the user can be deformed into a desired shape, the user can operate the manual controller easily.

According to the present invention, there is also provided a manual controller for connection to an apparatus for executing a program, for outputting information to the apparatus, comprising a control member, the control member having at least a portion to be pressed by a finger of the user of the manual controller, the portion being made of a shape memory synthetic resin. With the control member deformed into a desired shape, the user can operate the manual controller with ease.

The manual controller may be used as a manual controller for an entertainment apparatus, and the control member may comprise a control member of the manual controller. By deforming the control member into a desired shape, the user can operate the manual controller for the entertainment apparatus with ease.

The control member may comprise an outer face shell and a base disposed in the outer face shell. The outer face shell may be made of the shape memory synthetic resin, and the base may be made of a synthetic resin other than the shape memory synthetic resin. Inasmuch as the base is not deformed, the control member can reliably be mounted on a main body of the manual controller by the base.

The manual controller may further comprise a main body, and a holder by which the control member is movably held on the main body. The base may comprise a fixing member by which the control member is fixed to the holder. The control member can thus be operated movably, i.e., vertically and horizontally movably, tiltably, and rotatably, with respect to the main body.

The manual controller may be used as a mouse device, and the control member may comprise a pair of control members of the mouse device. The control members may be deformed into a desired shape to allow the user to operate the mouse device easily.

The control member may have a water-resistant structure. Since the control member can be dipped in hot water without suffering undue entry of water, the control member can easily be deformed into a desired shape.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Manual controllers according to embodiments of the present invention for use with an entertainment apparatus will be described below with reference to FIGS. 1 through 20.

First, an entertainment system which incorporates a manual controller according to the present invention will be described below.

Figure 1:
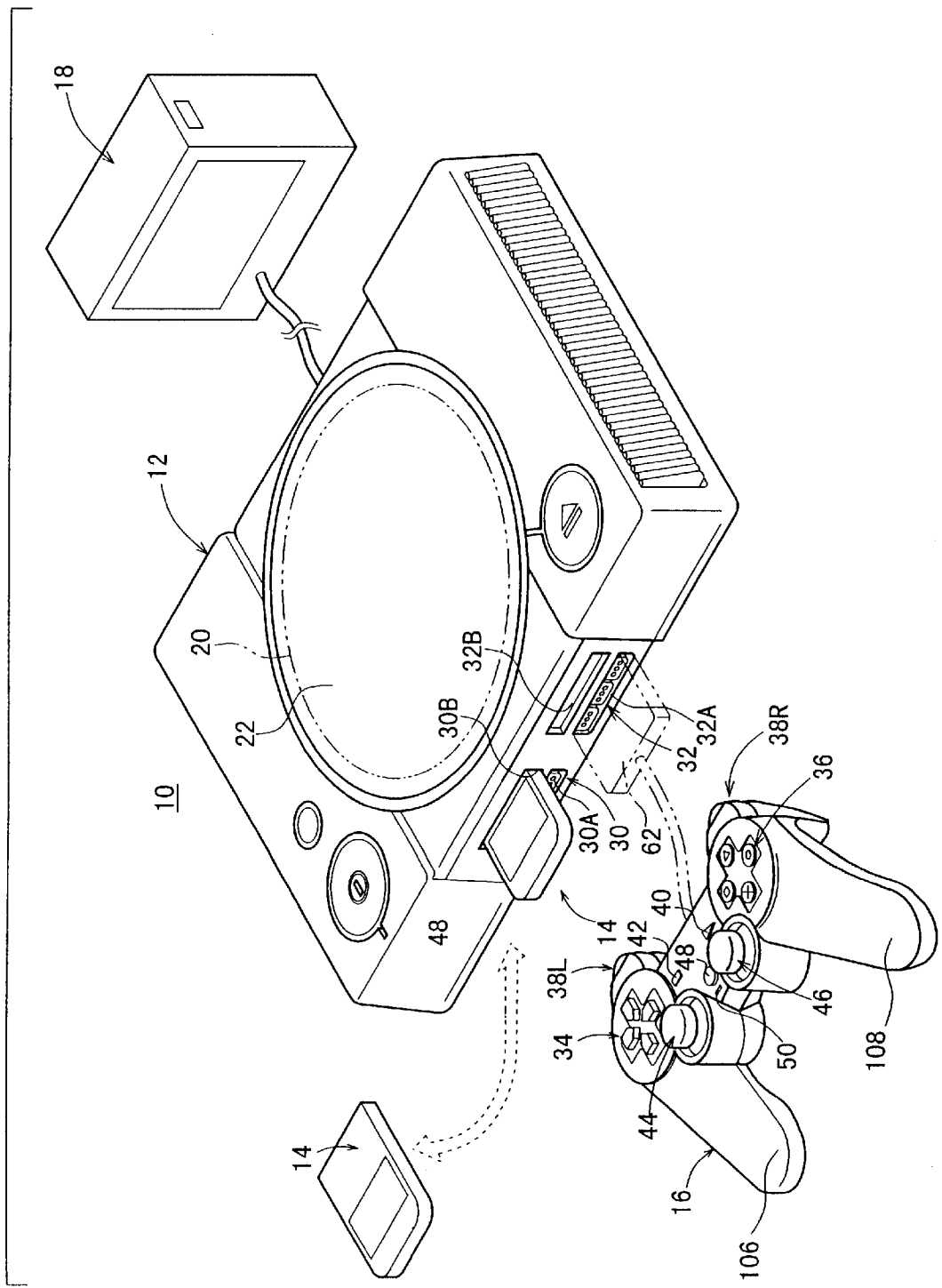
FIG. 1 is a perspective view of an entertainment system which incorporates a manual controller according to the present invention.

FIG. 1 shows an entertainment system 10 which basically comprises an entertainment apparatus 12 for executing various programs, a manual controller 16 detachably connected to the entertainment apparatus 12 by a connector 62, a display monitor 18 such as a television receiver which is supplied with video and audio output signals from the entertainment apparatus 12, and a portable information terminal 14 detachably connected to the entertainment apparatus 12 and operable by a built-in cell which may be a primary cell or a secondary cell.

The entertainment apparatus 12 reads a program recorded in a mass storage medium such as an optical disk 20 such as a CD-ROM or the like, and executes a game, for example, based on the program depending on commands supplied from the user, e.g., the game player. The execution of the game mainly represents controlling the progress of the game by controlling the display of images and the generation of sounds on the display monitor 18 based on manual input actions entered from the manual controller 16 via the connector 62.

The entertainment apparatus 12 has a substantially flat casing in the shape of a rectangular parallelepiped which houses a disk loading unit 22 disposed centrally for loading an optical disk 20 which stores an application program and data for a video game or the like. The casing also has two slots 30, 32.

The slots 30, 32 have respective upper slot units 30B, 32B and respective lower slot units 30A, 32A. The manual controller 16 can be connected to the lower slot units 30A, 32A. Memory cards (not shown) for storing flags indicative of interim game data or portable information terminals 14 having the function of such a memory card may be connected respectively to the upper slot units 30B, 32B. The slots 30, 32 (the upper slot units 30B, 32B and the lower slot units 30A, 32A) are asymmetrically shaped to prevent the connectors 62 and the memory cards or portable information terminals 14 from being inserted in the wrong direction.

Structural details of the manual controller 16 will be described below.

Figure 2:
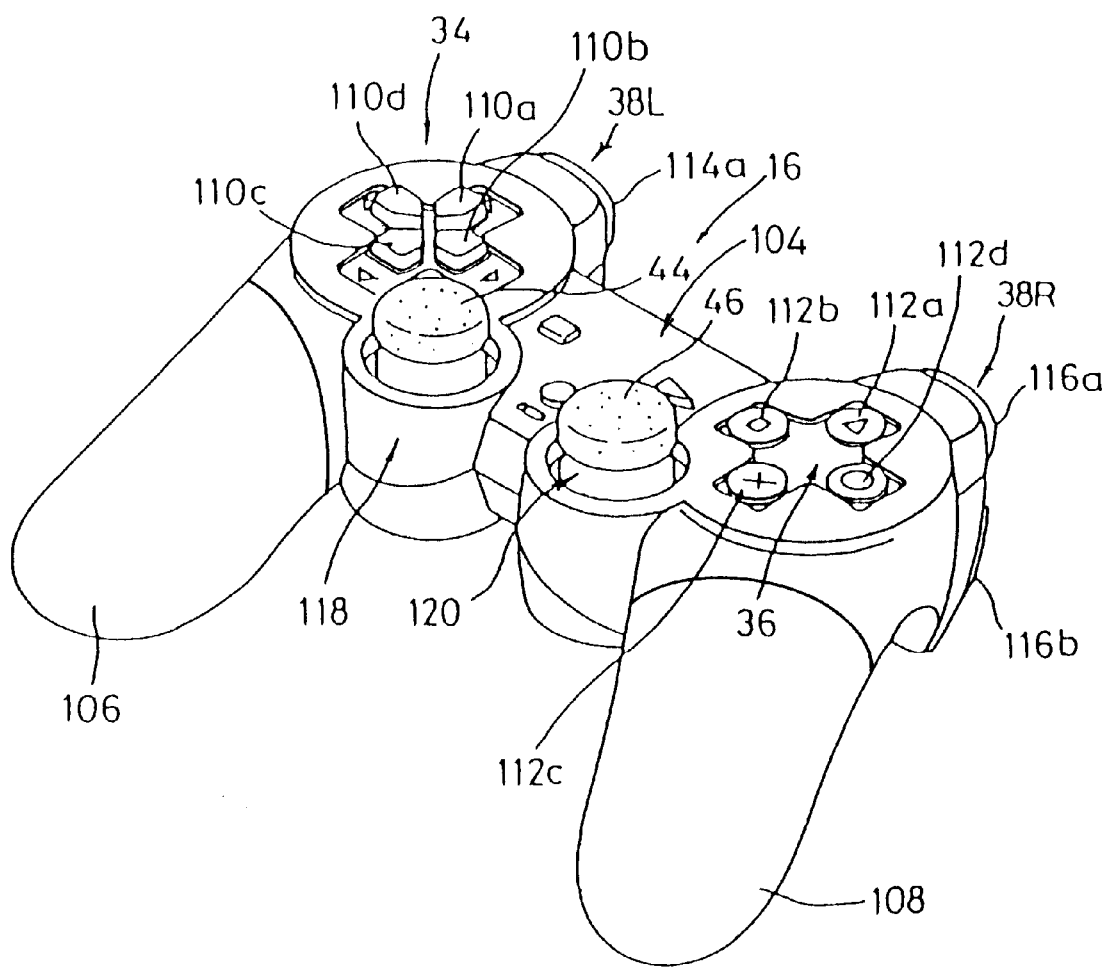
FIG. 2 is a perspective view of the manual controller.
Figure 3:
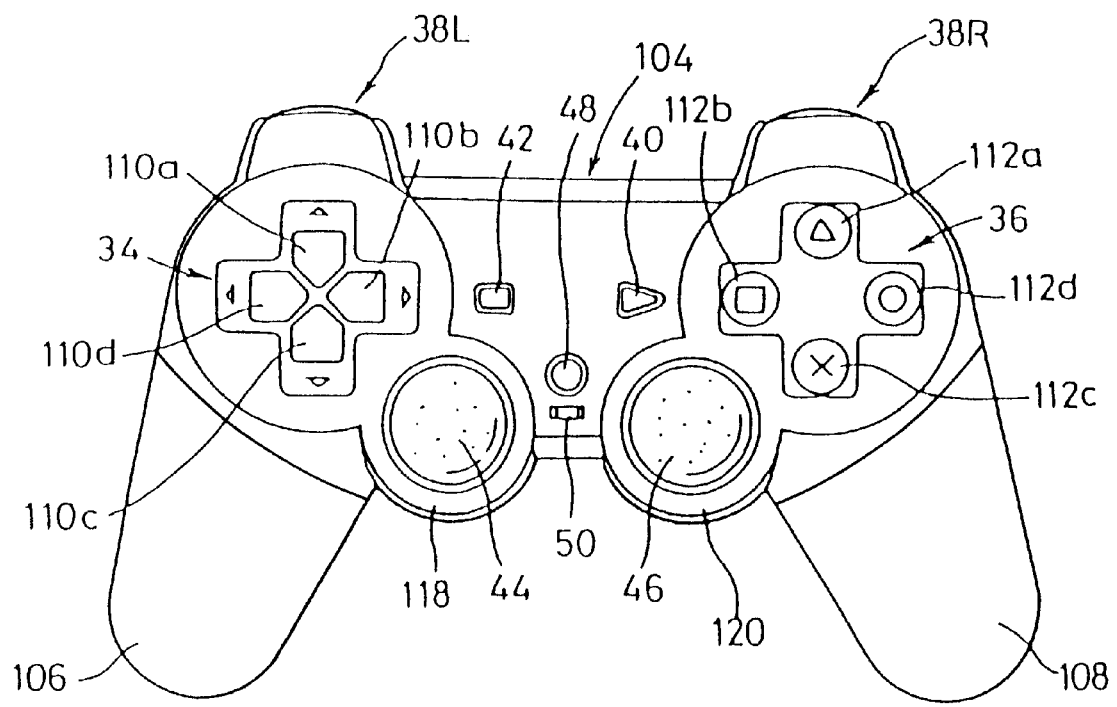
FIG. 3 is a plan view of the manual controller.

As shown in FIGS. 2 and 3, the manual controller 16 has a main body 104 and left and right grips 106, 108 joined to the main body 104.

The main body 104 has first and second control pads 34, 36, an L (Left) button 38L, an R (Right) button 38R, a start button 40, and a selection button 42. The main body 104 also has swivel control members or joysticks 44, 46 for inputting analog control actions, a mode selection switch 48 for selecting control modes of the joysticks 44, 46, and a mode indicator 50 for indicating a selected control mode. The mode indicator 50 comprises a light-emitting element such as a light-emitting diode or the like.

Figure 4:
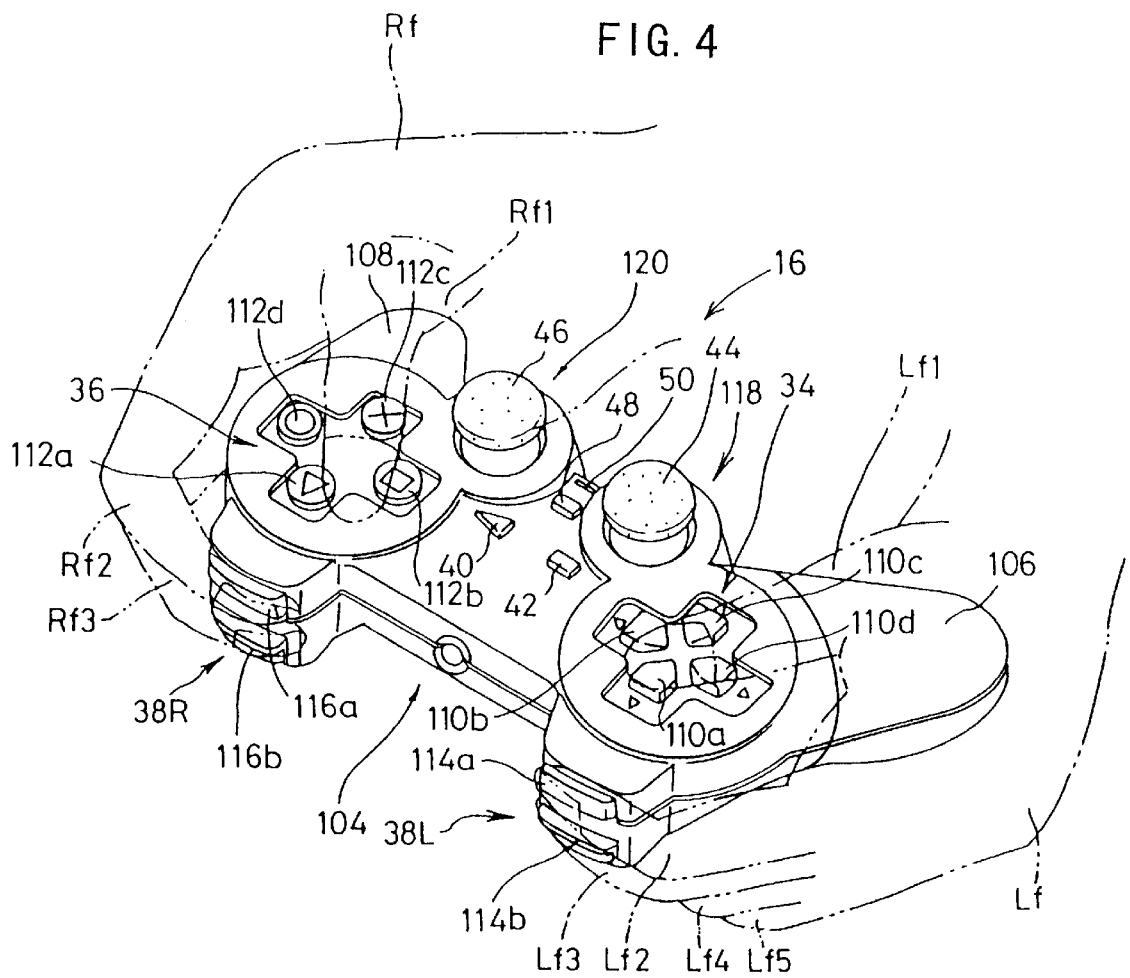
FIG. 4 is a perspective view showing the manner in which the manual controller is gripped by the palms of left and right hands of the user.

A pair of left and right grips 106, 108 projects from one side of respective opposite ends of the main body 104 and extends downwardly from the main body 104. As shown in FIG. 4, the left and right grips 106, 108 are shaped so as to be gripped by the palms of left and right hands of the user or game player when the manual controller 16 is connected to the entertainment apparatus 12 and information retrieval is carried out or the game is played thereby, for example.

As shown in FIG. 2, to allow the game player to grip the left and right grips 106, 108 comfortably for a long period of time, the left and right grips 106, 108 are tapered from their joint with the main body 104 toward their distal ends, and have arcuate outer peripheral surfaces and arcuate distal end surfaces.

As shown in FIGS. 2 and 3, the first control pad 34 is disposed on one end of the main body 104 and comprises a first pressable control member (up button) 110*a*, a second pressable control member (right button) 110*b*, a third pressable control member (down button) 110*c*, and a fourth pressable control member (left button) 110*d*. The first through fourth pressable control members 110*a*, 110*b*, 110*c*, 110*d* project on an upper surface of the main body 104 and are arranged in a crisscross pattern.

The first control pad 34 includes switch elements as signal input elements associated respectively with the first through fourth pressable control members 110*a*, 110*b*, 110*c*, 110*d*. The first control pad 34 functions as a directional controller for controlling the direction of movement of a displayed game character, for example. When the game player selectively presses the first through fourth pressable control members 110a, 110b, 110c, 110d to turn on or off the switch elements associated respectively with the first through fourth pressable control members 110a, 110b, 110c, 110d, the displayed game character moves in the direction corresponding to the pressed one of the first through fourth pressable control members 110a, 110b, 110c, 110d.

As shown in FIGS. 2 and 3, the second control pad 36 is disposed on the other end of the main body 104 and comprises a first pressable control member (Δ button) 112a, a second pressable control member (□ button) 112b, a third pressable control member (× button) 112c, and a fourth pressable control member (○ button) 112d. The first through fourth pressable control members 112a, 112b, 112c, 112d project on the upper surface of the main body 104 and are arranged in a crisscross pattern.

The first through fourth pressable control members 112a, 112b, 112c, 112d are constructed as independent members, and associated with respective switch elements disposed in the second control pad 36.

The second control pad 36 serves as a function setting/performing unit for setting functions for a displayed game character assigned to the pressable control members 112a–112d or performing functions of a displayed game character when the switch elements associated with the pressable control members 112a–112d are turned on.

As shown in FIG. 4, the L button 38L and the R button 38R are disposed on a side of the main body 104 remote from the left and right grips 106, 108 and positioned respectively at the opposite ends of the main body 104. The L button 38L has a first left pressable control member (L1 button) 114a and a second left pressable control member (L2 button) 114b, and the R button 38R has a first right pressable control member (R1 button) 116a and second right pressable control member (R2 button) 116b. The L button 38L and the R button 38R have respective switch elements associated respectively with the pressable control members (the L1 button 114a, the L2 button 114b, the R1 button 116a, and the R2 button 116b).

The L button 38L and the R button 38R serve as respective function setting/performing units for setting functions for a displayed game character assigned to the pressable control members 114a, 114b and 116a, 116b or performing functions of a displayed game character when the switch elements associated with the pressable control members 114a, 114b and 116a, 116b are turned on.

As shown in FIGS. 2 and 3, the manual controller 16 also has first and second analog control pads 118, 120 disposed respectively at confronting corners defined between the main body 104 and the proximal ends of the left and right grips 106, 108 which are joined to the main body 104.

The first and second analog control pads 118, 120 have the respective joysticks 44, 46 which can be tilted in all directions (360°) about control shafts thereof, and respective signal input elements such as variable resistors or the like which are operable by the respective joysticks 44, 46. Specifically, the left and right joysticks 44, 46 are mounted on respective upper ends of the control shafts that are normally urged to return to their neutral positions by biasing members. The left and the right joysticks 44, 46 can be freely tilted in all directions 360°) about the axes of the control shafts.

The first and second analog control pads 118, 120 can move a displayed game character while rotating the same or while changing its speed, and can make an analog-like action such as to change the form of a displayed character, when the game player manipulates the joysticks 44, 46. Therefore, the first and second analog control pads 118, 120 are used as a control unit for entering command signals for a displayed character to perform the above movement or action.

When the mode selection switch 48 is pressed, it selects a control mode for allowing a command signal to be inputted from the first and second analog control pads 118, 120 or a control mode for inhibiting a command signal from being inputted from the first and second analog control pads 118, 120.

When the mode selection switch 48 is pressed, it selects a control mode for allowing a command signal to be inputted from the first and second analog control pads 118, 120 and changing the functions of the first through fourth pressable control members 112a, 112b, 112c, 112d of the second control pad 36 and the functions of the pressable control members 114a, 114b and 116a, 116b of the L button 38L and the R button 38R. Depending on the control mode selected by the mode selection switch 48, the mode indicator 50 flickers and changes its indication light.

As shown in FIG. 4, the left and right grips 106, 108 projecting from the main body 104 are gripped respectively by the palms of the hands of the game player. The main body 104 is not required to be supported by fingers, and the manual controller 16 can be held by the hands while at least six out of the ten fingers of the hands can freely be moved.

As shown in FIG. 4, when the left and right grips 106, 108 are gripped respectively by the palms of the hands of the game player, the thumbs Lf1, Rf1 of the left and right hands can extend over the joysticks 44, 46 of the first and second analog control pads 118, 120, the first through fourth pressable control members 110a–110d of the first control pad 34, and the first through fourth pressable control members 112a–112d of the second control pad 36, and can selectively press the joysticks 44, 46, the pressable control members 110a–110d, and the pressable control members 112a–112d.

Since the joysticks 44, 46 of the first and second analog control pads 118, 120 are positioned in confronting relation to the proximal ends of the left and right grips 106, 108 which are joined to the main body 104, when the left and right grips 106, 108 are gripped by the left and right hands, the joysticks 44, 46 are positioned most closely to the thumbs Lf1, Rf1, respectively. Therefore, the joysticks 44, 46 can easily be manipulated by the thumbs Lf1, Rf1.

As shown in FIG. 4, when the left and right grips 106, 108 are gripped respectively by the palms of the hands of the game player, the index fingers Lf2, Rf2 and middle fingers Lf3, Rf3 of the left and right hands can extend over positions where they can selectively press the L1 button 114a, L2 button 114b of the L button 38L and R1 button 116a, R2 button 116b of the R button 38R.

A manual controller according to a first embodiment of the present invention, which is basically identical to the manual controller 16 shown in FIGS. 1 through 4, will be described below.

Figure 5:
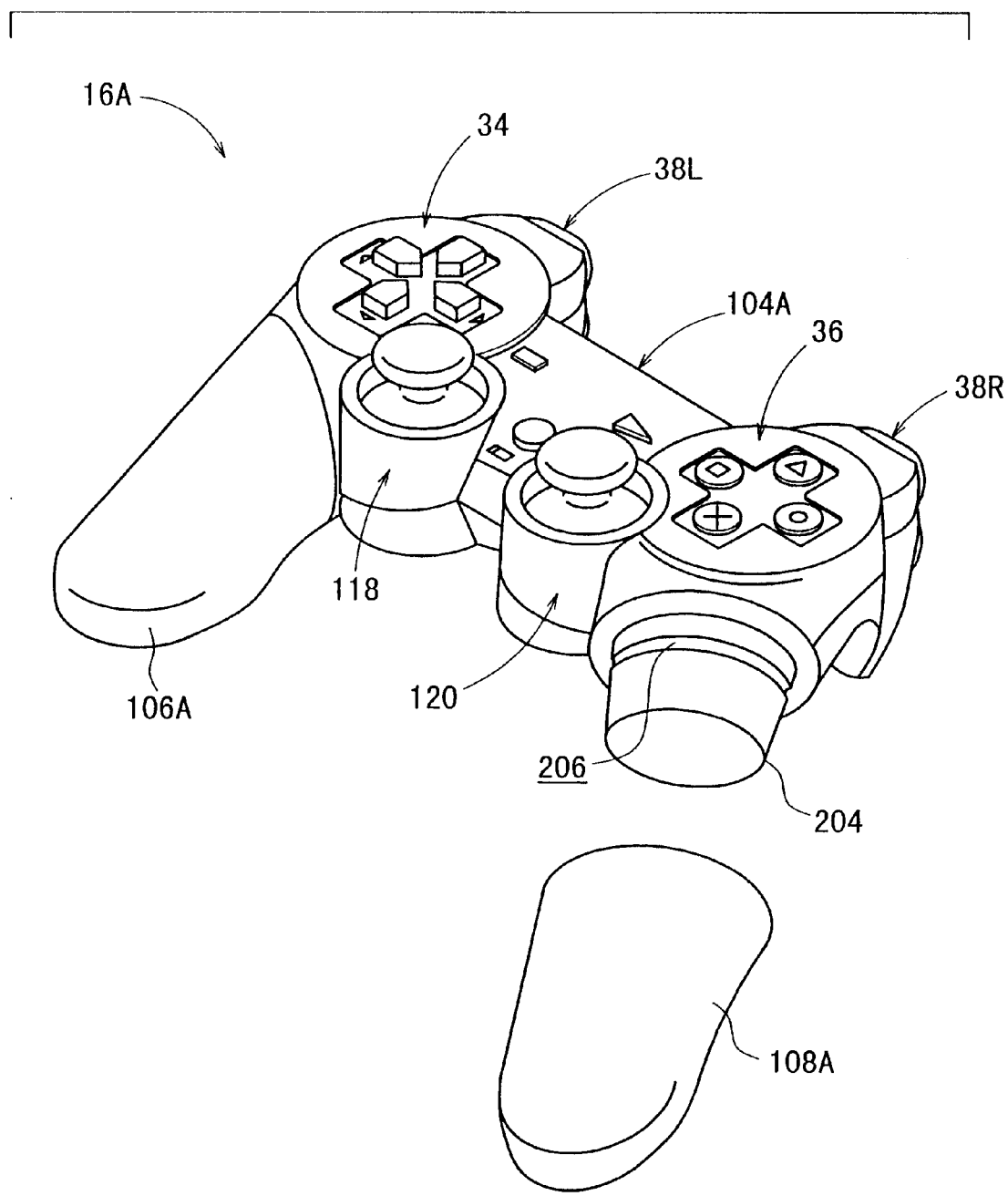
FIG. 5 is a perspective view of a manual controller according to a first embodiment of the present invention with a right grip detached.

As shown in FIG. 5, a manual controller 16A according to the first embodiment of the present invention has a pair of grips 106A, 108A detachably joined to a main body 104A.

Figure 6:
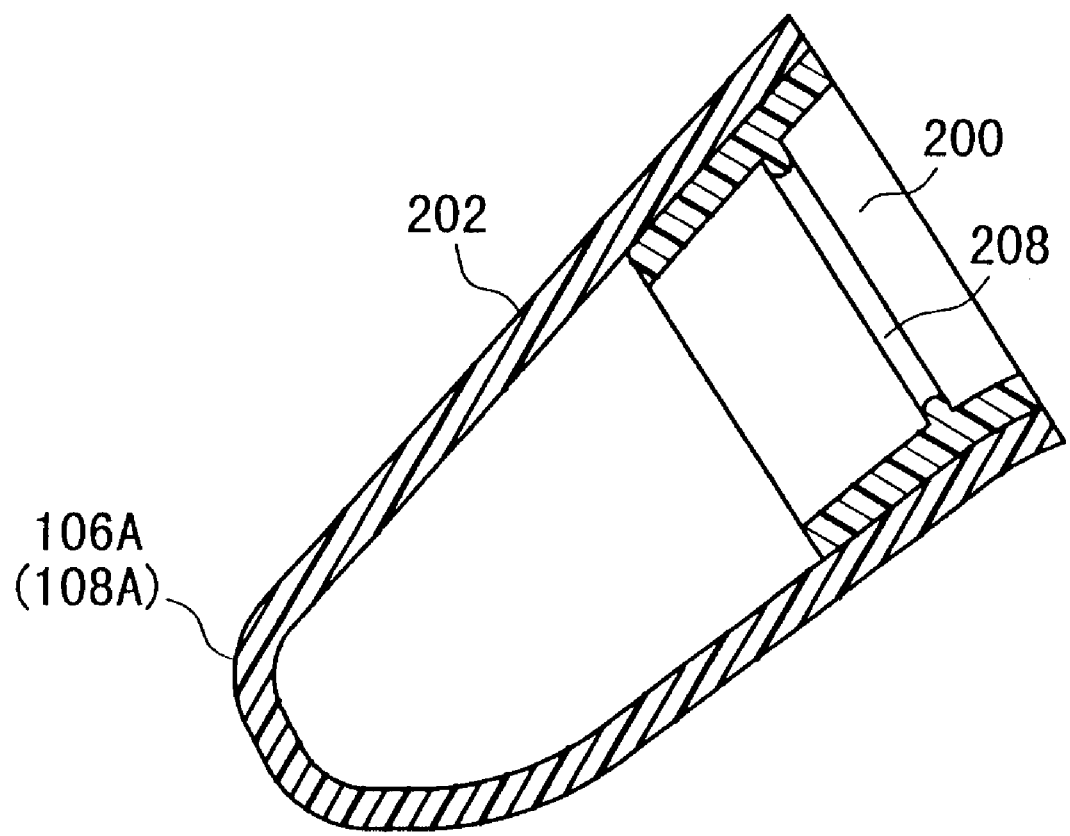
FIG. 6 is a cross-sectional view of a grip of the manual controller shown in FIG. 5.

As shown in FIG. 6, each of the grips 106A, 108A is of a hollow structure, and has a base 200 on its proximal end and an outer face shell 202 covering an opening of the base 200 and providing an outer face of the grip 106A, 108A.

As shown in FIG. 5, the main body 104A has a pair of substantially cylindrical protrusions 204 spaced from each other which support the respective grips 106A, 108A. As shown in FIG. 6, the base 200 has an inner surface shaped complementarily to each of the substantially cylindrical protrusions 204 such that the base 200 can snugly fit over each of the substantially cylindrical protrusions 204.

As shown in FIGS. 5 and 6, each of the substantially cylindrical protrusions 204 has an annular groove 206 defined in an outer circumferential surface thereof, and the base 200 has an annular ridge 208 projecting on the inner surface thereof. When the grips 106A, 108A are pushed over the respective protrusions 204 until the protrusions 204 are inserted into the respective bases 200, the annular ridges 208 are snap-fitted into the respective annular grooves 206. In this manner, the grips 106A, 108A are firmly mounted on the main body 104A.

Alternatively, the protrusions 204 and the bases 200 may have teeth and recesses, and the grips 106A, 108A may be securely mounted on the respective protrusions 204 by interfitting engagement between the teeth and the recesses.

As shown in FIG. 6, the base 200 and the outer face shell 202 are integrally molded of different synthetic resin materials by double-shot molding. Particularly, the outer face shell 202 is molded of a shape memory synthetic resin, for example, a synthetic resin known as "MEMORY RUBBER" (registered trademark) manufactured by MARUYOSHI. The shape memory synthetic resin is a synthetic resin capable of memorizing a shape given thereto. The shape memory synthetic resin includes a synthetic resin which contains a shape memory synthetic resin so as to have a substantial shape memorizing capability.

When the shape memory synthetic resin which has memorized a given shape is heated to 40° C., for example, or higher, it softens and can be changed in shape freely. After the heated shape memory synthetic resin has been changed in shape, its temperature is lowered below 40° C., and the shape memory synthetic resin is hardened with the changed shape. When the shape memory synthetic resin which has been changed in shape is heated again to 40° C. or higher, the shape memory synthetic resin returns to its originally memorized shape.

Figure 7:
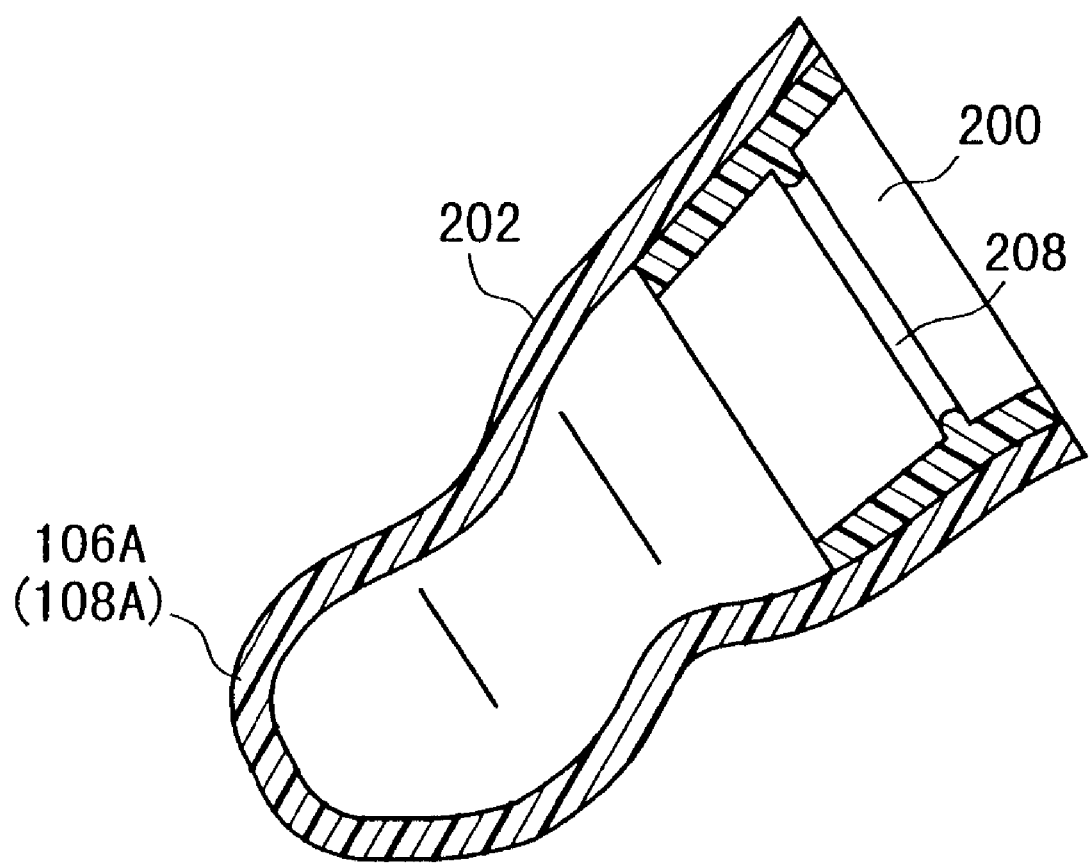
FIG. 7 is a cross-sectional view of the grip which has been deformed.
Figure 8:
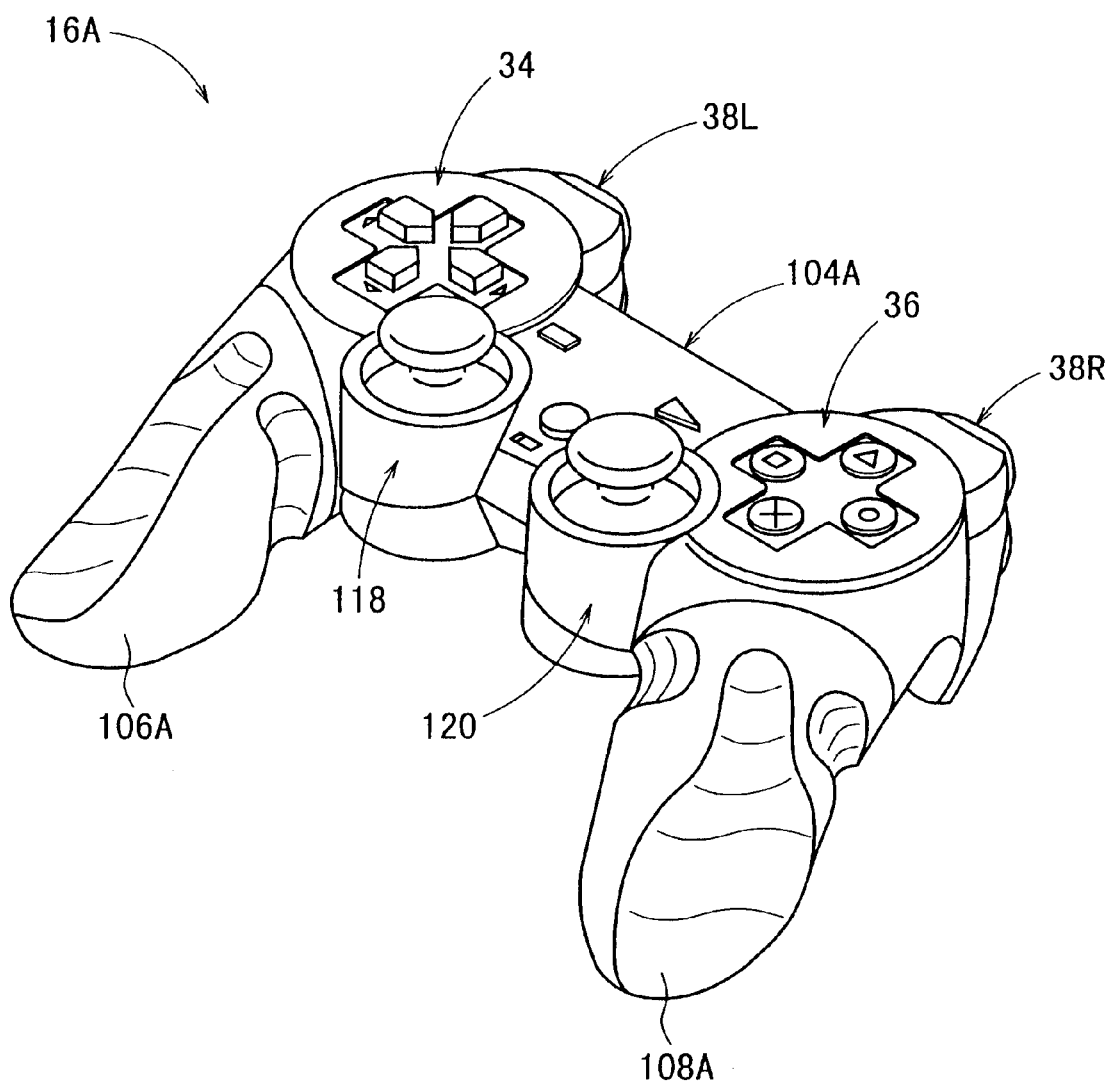
FIG. 8 is a perspective view of the manual controller with deformed grips shown in FIG. 7 being mounted thereon.

Therefore, the outer face shell 202 of each of the grips 106A, 108A can be deformed from the memorized shape shown in FIG. 6 into a desired shape shown in FIG. 7. To thus deform the outer face shell 202, the user grips the grips 106A, 108A and puts them into hot water at a temperature of 40° C. or higher. After the grips 106A, 108A have been deformed into a shape complementary to the gripping hands, the user removes the grips 106A, 108A from the hot water and cools the grips 106A, 108A to retain the deformed shape. Consequently, the grips 106A, 108A can be deformed into the shape that can most comfortably be gripped by the user, as shown in FIG. 8. As a result, different users can change the shape of the grips 106A, 108A into desired different forms which best fit their hands when they grip the grips 106A, 108A.

As shown in FIGS. 6 and 7, the base 200 is molded of a synthetic resin other than the shape memory synthetic resin. Therefore, the base 200 is not deformed in the process of deforming the outer face shell 202. Since the base 200 remained undeformed, it can reliably and securely be mounted on each of the grips 106A, 108A.

Inasmuch as the grips 106A, 108A can be deformed into a desired shape, e.g., a shape complementary to the user's gripping palm, the user finds the manual controller 16A easy and comfortable to use.

When the deformed grips 106A, 108A are heated again to 40° C. or higher, they automatically return to the originally memorized shape, i.e., the shape shown in FIGS. 5 and 6. Therefore, the grips 106A, 108A are free of the risk of becoming deformed into a shape other than the desired shape.

Moreover, because the grips 106A, 108A are detachable from the main body 104A, they can be detached from the main body 104A and dipped in hot water to change their shape. Accordingly, the process of deforming the grips 106A, 108A is facilitated.

A manual controller according to a second embodiment of the present invention will be described below.

Figure 9:
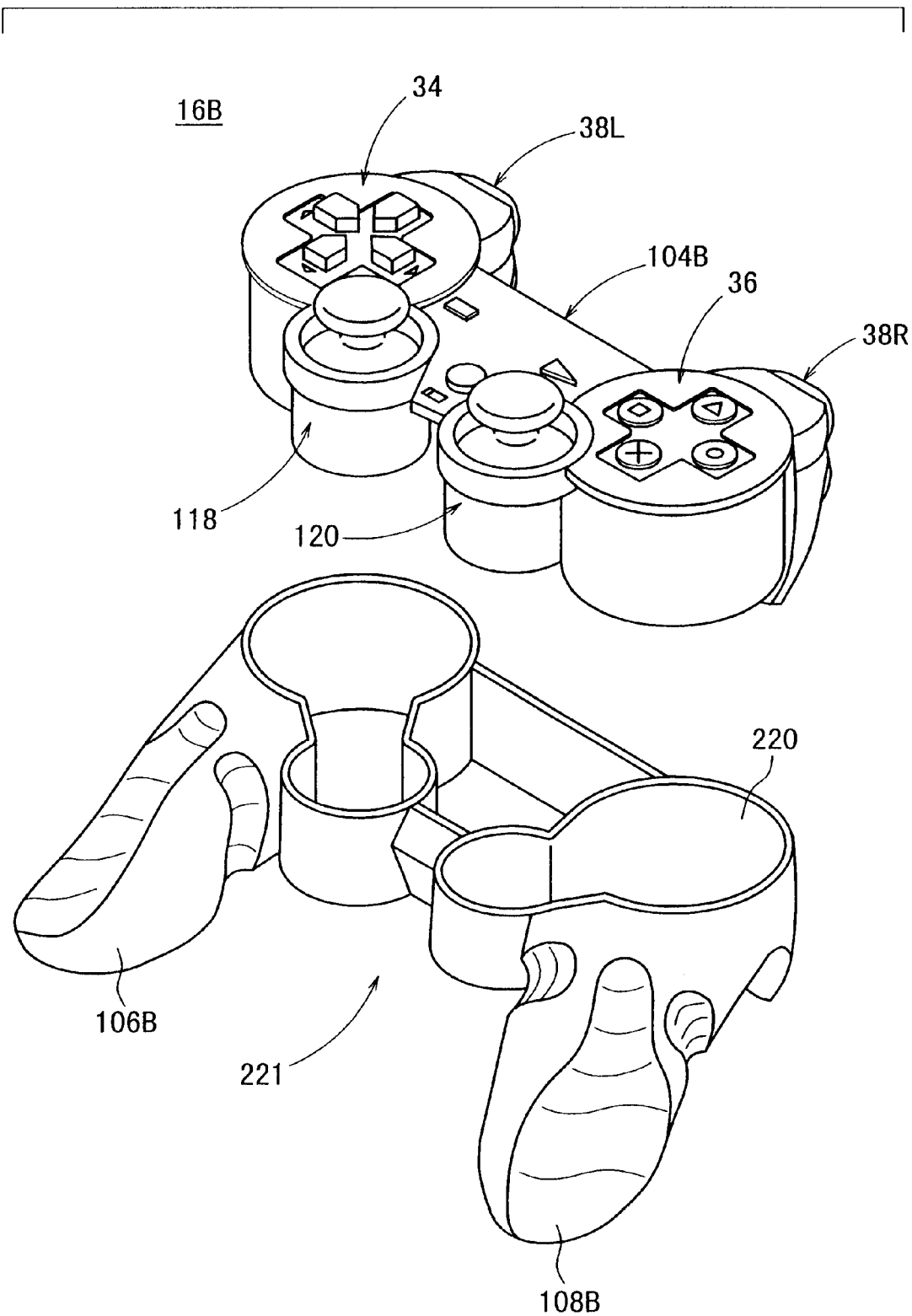
FIG. 9 is an exploded perspective view of a manual controller according to a second embodiment of the present invention.

FIG. 9 shows a manual controller 16B according to the second embodiment of the present invention. As shown in FIG. 9, the manual controller 16B comprises a housing 221 and a main body 104B detachably mounted on the housing 221. The housing 221 has an integral structure comprising a pair of grips 106B, 108B and a joint 220 extending between the grips 106B, 108B. The joint 220 is in the form of a case complementary in shape to a lower portion of the main body 104B. When the joint 220 of the housing 221 is fitted over the lower portion of the main body 104B, the grips 106B, 108B are mounted on the main body 104B.

Figure 10:
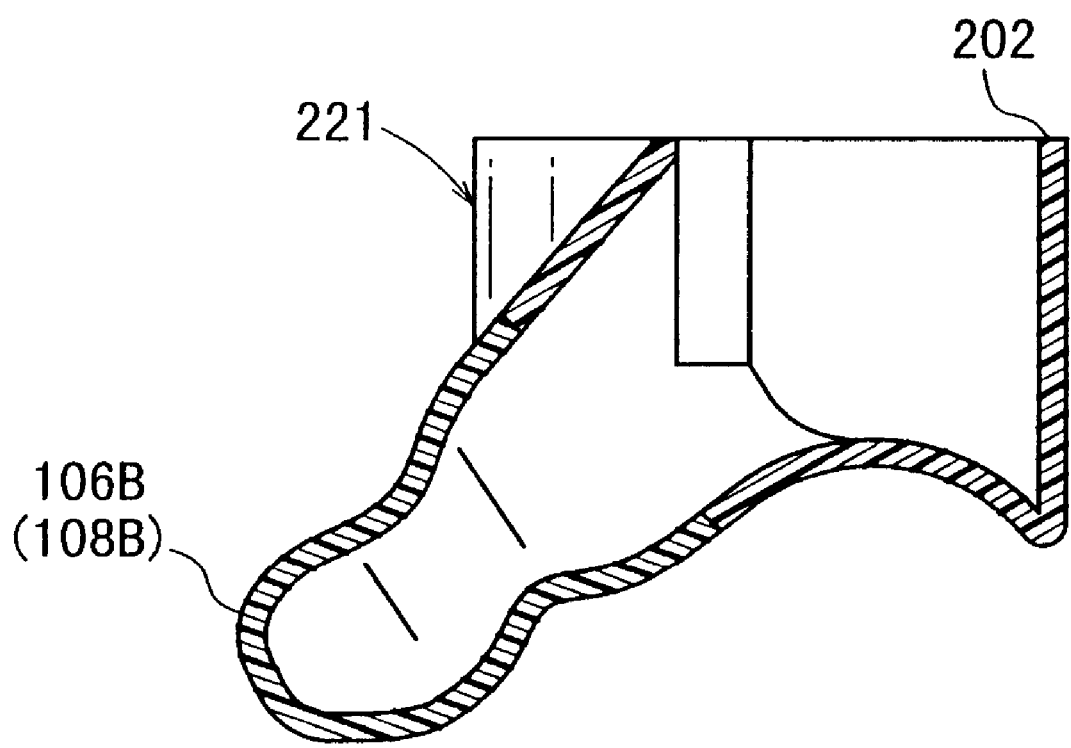
FIG. 10 is a cross-sectional view of a grip and a joint of a housing of the manual controller according to the second embodiment.

As shown in FIG. 10, the grips 106B, 108B and the joint 220 are integrally molded of different synthetic resin materials by double-shot molding. Particularly, the grips 106B, 108B are molded of a shape memory synthetic resin.

Therefore, as shown in FIG. 9, the grips 106B, 108B can be deformed into a desired shape, e.g., a shape complementary to the user's gripping palm, the user finds the manual controller 16B easy and comfortable to use.

Since the grips 106B, 108B integral with the joint 220 are detachable from the main body 104B, they can be detached from the main body 104B and dipped in hot water to change their shape. Accordingly, the process of deforming the grips 106B, 108B is facilitated.

The joint 220 is molded of a synthetic resin other than the shape memory synthetic resin. Therefore, the joint 220 is not deformed in the process of deforming the grips 106B, 108B. Thus, the grips 106B, 108B joined to the joint 220 can reliably and securely be mounted on the main body 104B.

A manual controller according to a third embodiment of the present invention will be described below.

Figure 11:
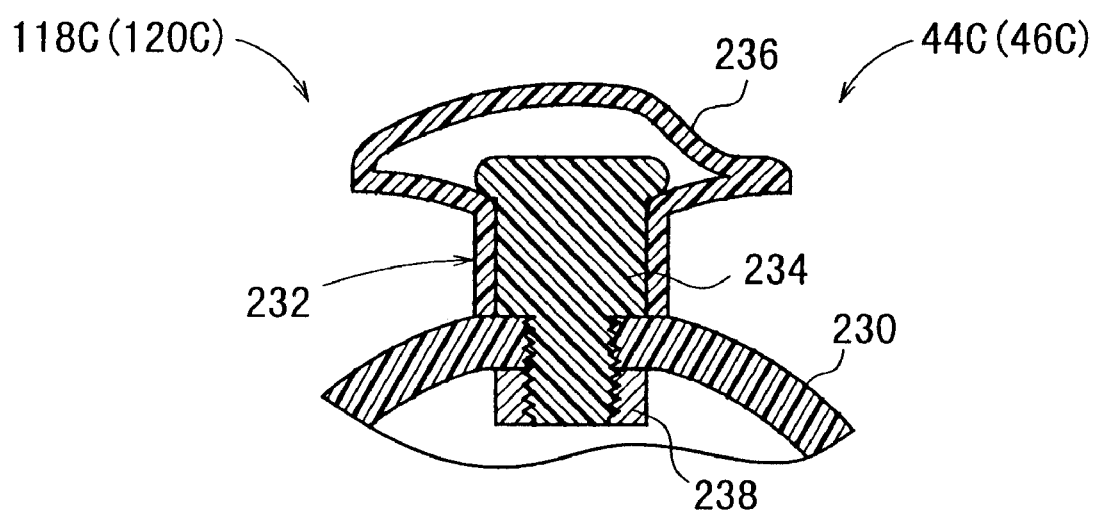
FIG. 11 is a fragmentary cross-sectional view of a joystick of a manual controller according to a third embodiment of the present invention.

FIG. 11 shows a manual controller 16C according to the third embodiment of the present invention. As shown in FIG. 11, the manual controller 16C includes first and second analog control pads 118C, 120C having respective joysticks 44C, 46C. Each of the joysticks 44C, 46C comprises a rotatable spherical member 230 connected to a signal input element, not shown, and a protrusion 232 mounted on the spherical member 230. The protrusion 232 and the spherical member 230 are separate from each other.

The protrusion 232 comprises a screw member 234 and a head 236 having a lower portion connected to the screw member 234 in covering relation thereto. The head 236 has a space defined therein around an upper end of the screw member 234.

The screw member 234 and the head 236 are integrally molded of different synthetic resin materials by double-shot molding. Particularly, the head 236 is molded of a shape memory synthetic resin.

The protrusion 232 is secured to the spherical member 230 by a nut 238 threaded over the screw member 234 that extends into the spherical member 230. Therefore, the protrusion 232 is detachable from the spherical member 230.

The head 236 can be deformed into a desired shape. Specifically, the protrusion 232 detached from the spherical member 230 is dipped into hot water at a temperature of 40° C. or higher, and then deformed into a desired shape. Thereafter, the protrusion 232 is removed from the hot water and cooled to a temperature lower than 40° C., thereby retaining the deformed shape.

Figure 12:
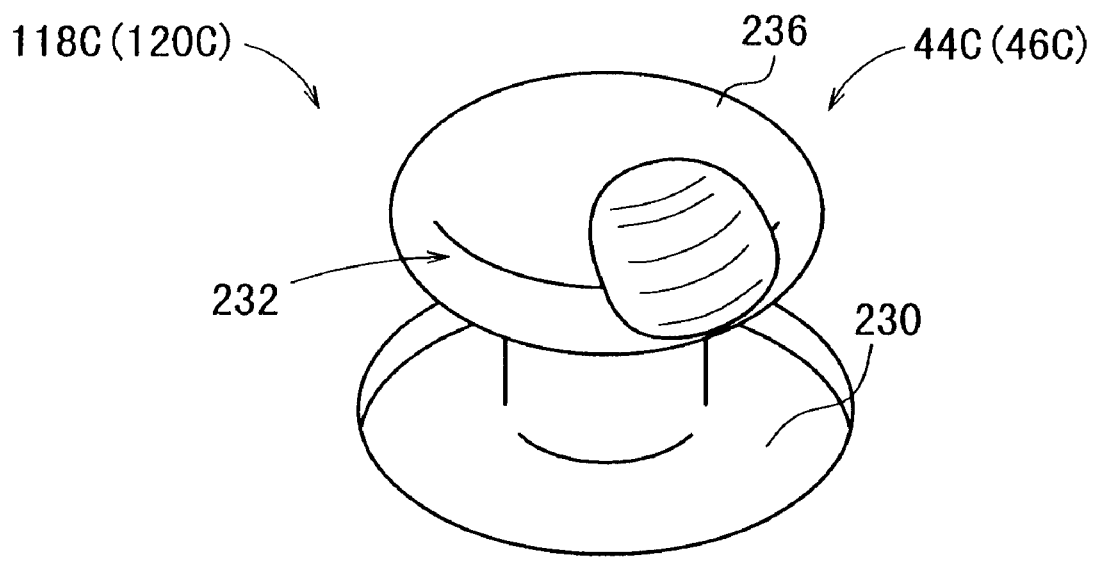
FIG. 12 is a perspective view of the joystick shown in FIG. 11.

For example, as shown in FIG. 12, while the head 236 is being dipped in hot water, the user presses the thumb against the head 236 to deform a portion, such as a corner, of the head 236, which will be pressed by the thumb when the user uses the manual controller 16C, into a shape complementary to the thumb. In this manner, the protrusion 232 can be deformed into a shape which provides a neat fit between the head 236 and the thumb. Therefore, the user can operate the joysticks 44C, 46C easily and comfortably.

The screw member 234 is molded of a synthetic resin other than the shape memory synthetic resin. Therefore, the screw member 234 is not deformed in the process of deforming the head 236. The protrusion 232 can reliably and securely be mounted on the spherical member 230.

A manual controller according to a fourth embodiment of the present invention will be described below.

Figure 13:
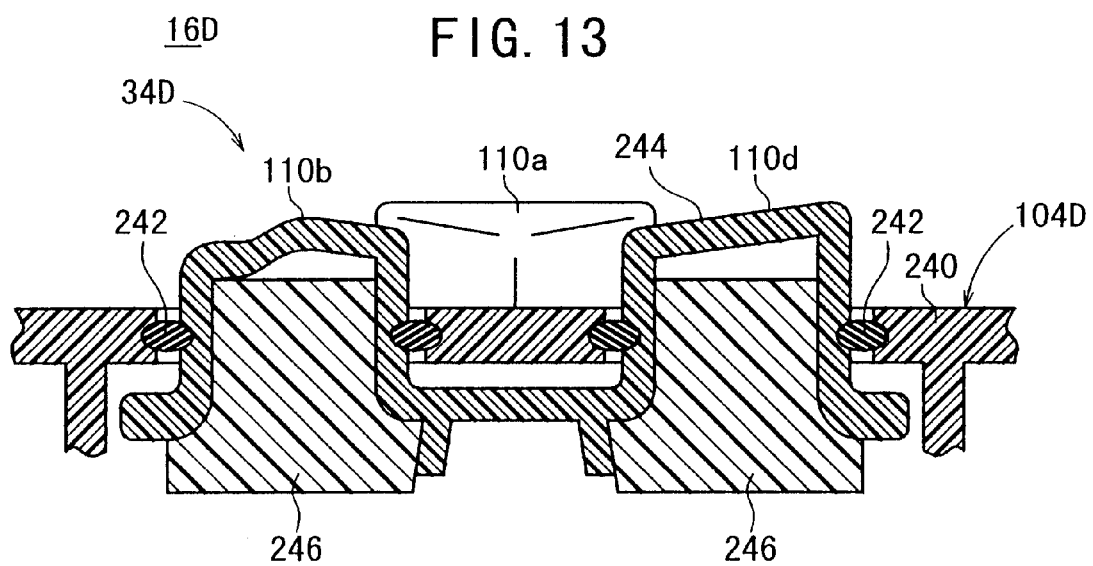
FIG. 13 is a cross-sectional view of a first control pad of a manual controller according to a fourth embodiment of the present invention.

FIG. 13 shows a manual controller 16D according to the fourth embodiment of the present invention. As shown in FIG. 13, the manual controller 16D includes a first control pad 34D having control members 110a, 110b, 110c, 110d, a main body 104D including a casing 240, and seal members 242 which provide a seal between the control members 110a, 110b, 110c, 110d and the casing 240.

Each of the control members 110a, 110b, 110c, 110d comprises an outer face shell 244 providing an outer face of the control member, and a base 246 disposed in the outer face shell 244. The outer face shell 244 has a space defined therein around an upper end of the base 246.

The outer face shell 244 and the base 246 are integrally molded of different synthetic resin materials by double-shot molding. Particularly, the outer face shell 244 is molded of a shape memory synthetic resin.

Upper portions of the control members 110a, 110b, 110c, 110d can be deformed into a desired shape. Specifically, the upper portions of the control members 110a, 110b, 110c, 110d are dipped into hot water at a temperature of 40° C. or higher, and then deformed into a desired shape. Thereafter, the upper portions of the control members 110a, 110b, 110c, 110d are removed from the hot water and cooled to a temperature lower than 40° C., thereby retaining the deformed shape.

Figure 14:
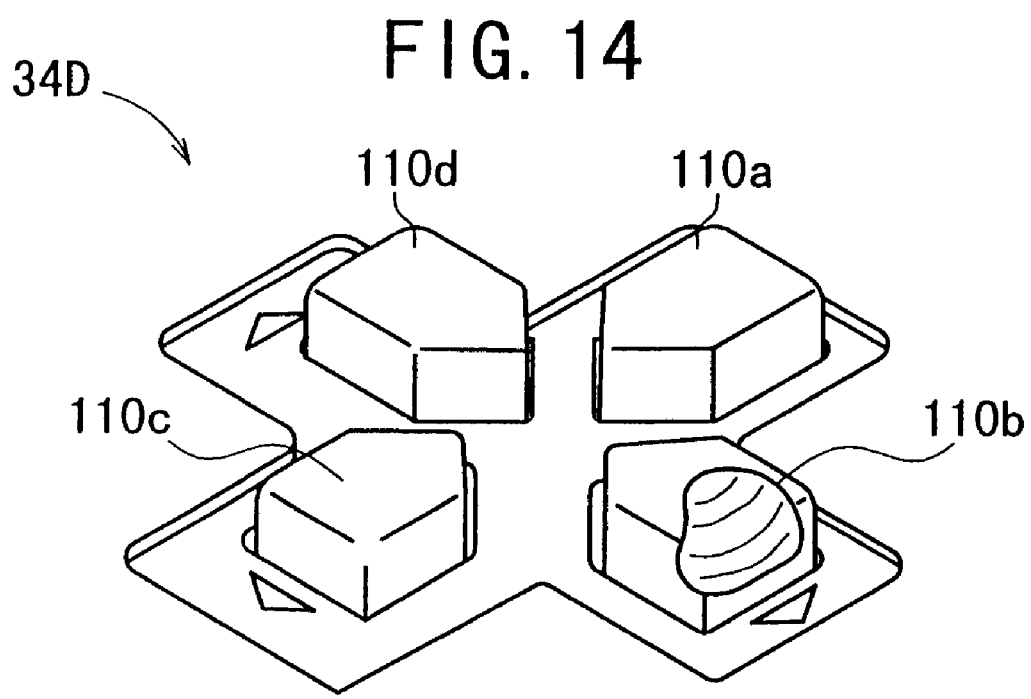
FIG. 14 is a perspective view of the first control pad shown in FIG. 13.

For example, as shown in FIG. 14, while the upper portion of the control member 110b is being dipped in hot water, the user presses the thumb against the upper portion of the control member 110b to deform a portion, such as a corner, thereof, which will be pressed by the thumb when the user uses the manual controller 16D, into a shape complementary to the thumb. In this manner, the upper portion of the control member 110b can be deformed into a shape which provides a neat fit between the control member 110b and the thumb. The other control members 110a, 110c, 110d can also be deformed into a desired shape. Therefore, the user can operate the control members 110a, 110b, 110c, 110d easily and comfortably.

Since the base 246 is positioned in the outer face shell 244, the other portion of the outer face shell 244 than the upper portion thereof is not deformed even when pressed by the user. Particularly, the portion of the outer face shell 244 which is held in contact with the seal member 242 is prevented from being deformed. Therefore, the seal between the control members 110a, 110b, 110c, 110d and the casing 240 is not impaired.

The seal members 242 provide a water-resistant structure which gives a reliable seal between the control members 110a, 110b, 110c, 110d and the casing 240. Therefore, when the control members 110a, 110b, 110c, 110d are dipped into hot water, the water-resistant structure prevents the hot water from entering the main body 104D. Thus, the process of deforming the control members 110a, 110b, 110c, 110d is facilitated.

A mouse device according to the present invention will be described below.

Figure 15:
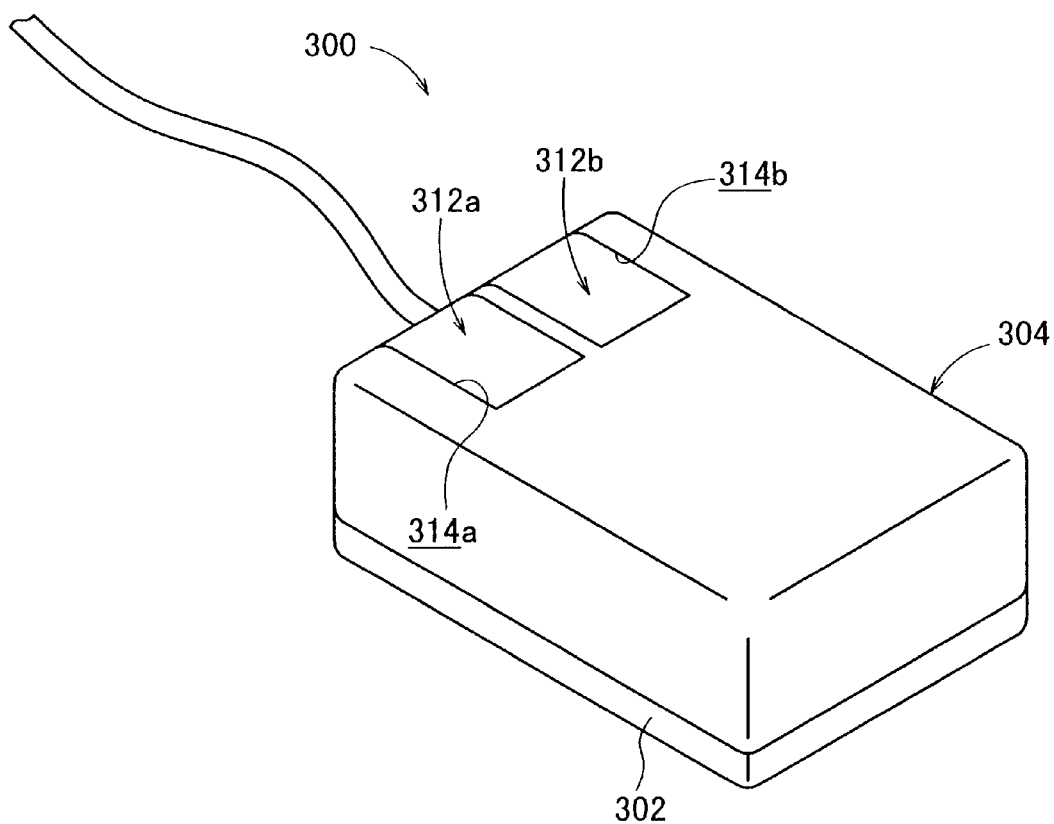
FIG. 15 is a perspective view of a mouse device according to the present invention.
Figure 16:
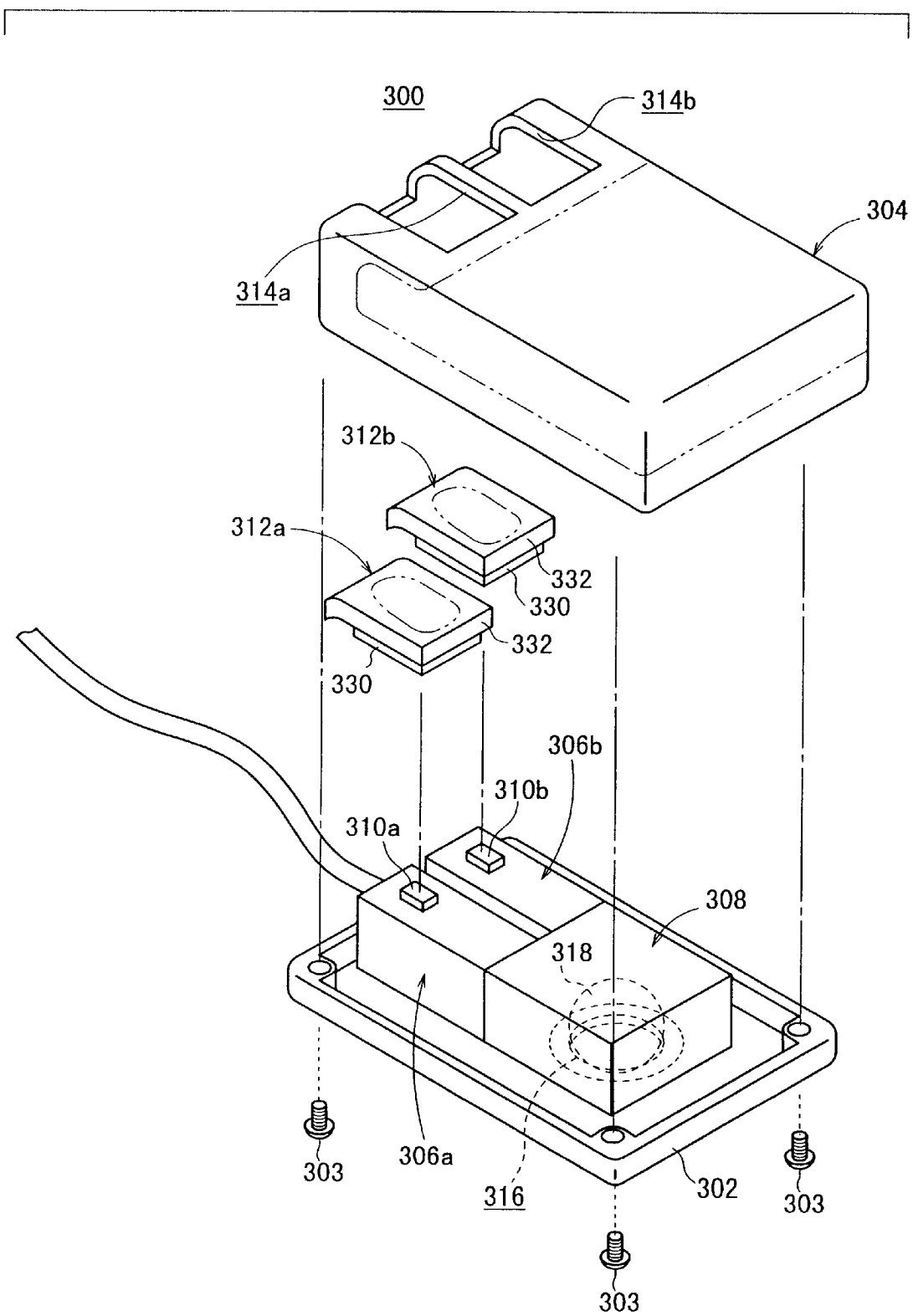
FIG. 16 is an exploded perspective view of the mouse device shown in FIG. 15.

FIG. 15 shows in perspective a mouse device 300 according to the present invention, and FIG. 16 shows mouse device 300 in exploded perspective.

As shown FIGS. 15 and 16, the mouse device 300 comprises a support 302 and a casing 304 mounted on and fastened to the support 302 by screws 303. The casing 304 serves as a grip which is gripped by the user.

As shown in FIG. 16, the support 302 is substantially in the form of a plate. Left and right switch units 306a, 306b and a displacement detecting unit 308 are mounted on the support 302. The support 302, the switch units 306a, 306b, and the displacement detecting unit 308 jointly make up a mouse assembly in the mouse device 300.

The switch units 306a, 306b have respective switch elements 310a, 310b disposed on upper surfaces thereof and connected respectively to left and right buttons 312a, 312b. As shown in FIG. 15, the left and right buttons 312a, 312b are mounted respectively in left and right recesses 314a, 314b that are defined in a front end of an upper panel of the casing 304. The switch units 306a, 306b and the buttons 312a, 312b jointly make up a control pad in the mouse device 300.

As shown in FIGS. 15 and 16, when the user presses the buttons 312a, 312b to actuate the switch elements 310a, 310b, the switch units 306a, 306b output respective signals from the switch elements 310a, 310b to a general-purpose computer, which may include a personal computer. The general-purpose computer controls the execution of various programs based on the signals from the switch elements 310a, 310b.

As shown in FIG. 16, the displacement detecting unit 308 has a ball 318 disposed in a hole 316 that is defined in the support 302. The ball 318 placed in the hole 316 has a lower portion projecting downwardly from a lower end of the hole 316, i.e., a lower surface of the support 302. When the support 302 is placed on a table (not shown) and moved on the table, the ball 318 rotates in the hole 316.

The displacement detecting unit 308 also has X-Y displacement sensors (not shown) held in contact with the ball 318. The X-Y displacement sensors detect an angular displacement of the ball 318, i.e., a distance by and a direction in which the support 302 has moved on the table. The X-Y displacement sensors output signals representing the distance and the direction to the general-purpose computer.

Figure 17:
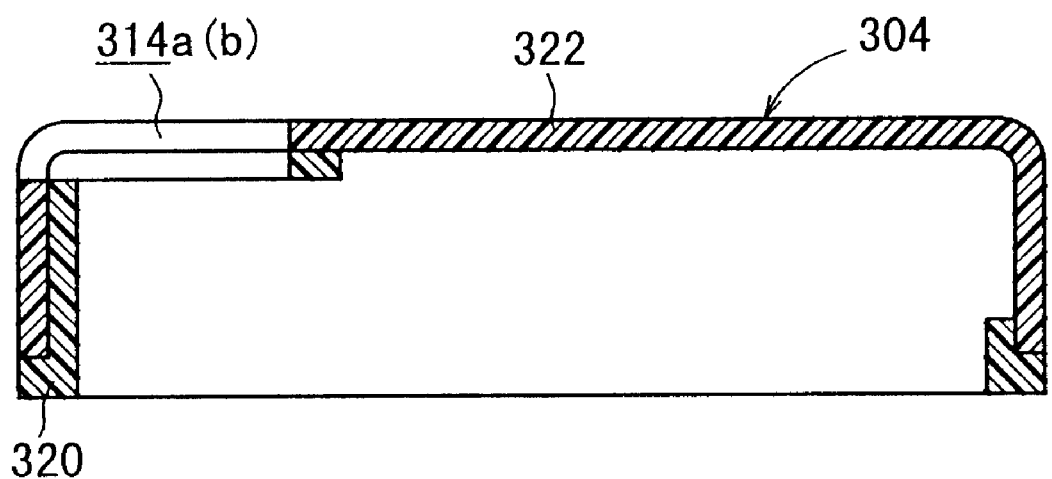
FIG. 17 is a cross-sectional view of a casing of the mouse device shown in FIG. 16.

As shown in FIG. 17, the casing 304 comprises a base 320 providing a lower portion of the casing 304 and peripheral edges of the recesses 314a, 314b, and an outer face shell 322 providing an outer face of the casing 304 and joined to the base 320 in covering relation thereto.

The base 320 and the outer face shell 322 are integrally molded of different synthetic resin materials by double-shot molding. Particularly, the outer face shell 322 is molded of a shape memory synthetic resin. The casing 304 can be deformed into a desired shape. Specifically, the casing 304 is dipped into hot water at a temperature of 40° C. or higher, and rear corners, for example, of an upper panel of the casing 304 are then deformed into a desired shape. Thereafter, the casing 304 is removed from the hot water and cooled to a temperature lower than 40° C., thereby retaining the deformed shape.

Figure 18:
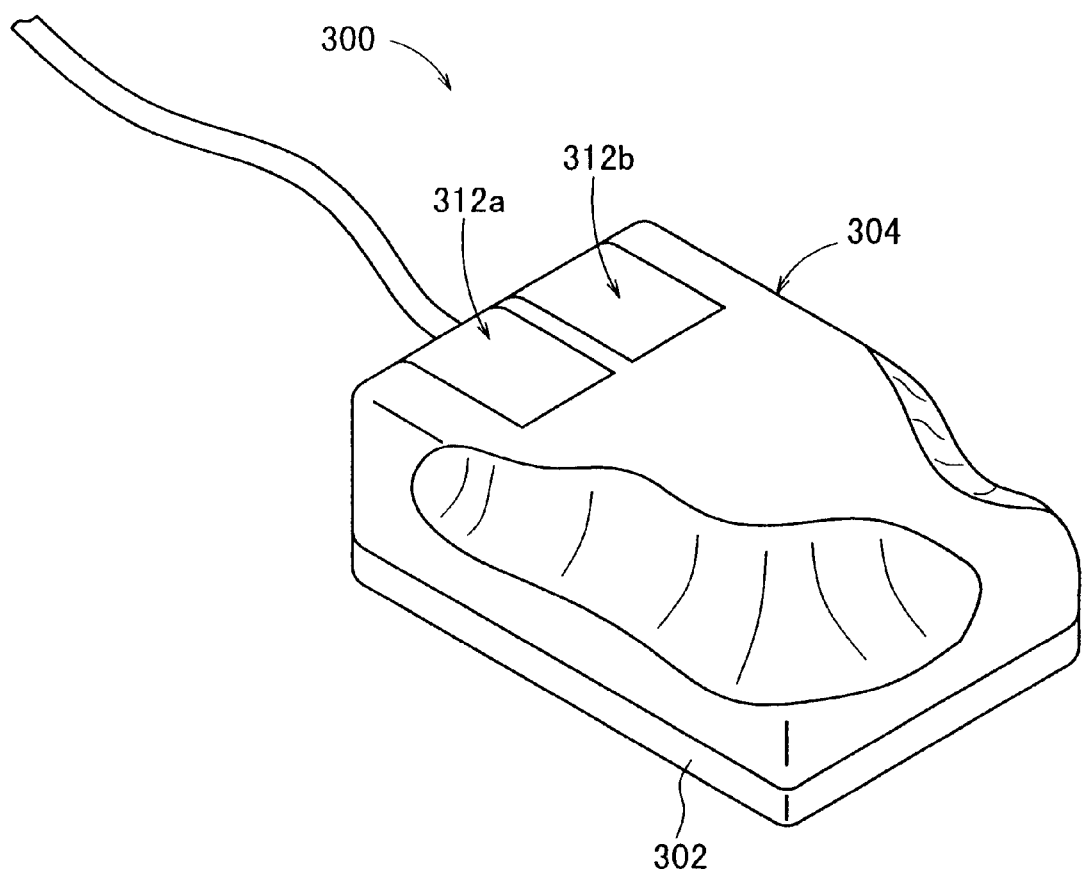
FIG. 18 is a perspective view of the mouse device with the casing deformed.

For example, the portion of the casing 304 that is gripped by a hand of the user can be deformed into a shape complementary to the palm of the hand, as shown in FIG. 18.

Because the casing 304 is deformed into a shape complementary to the palm of the hand, the user will not be physically fatigued from continuously holding the mouse device 300, and can operate the mouse device 300 easily.

The portion of the casing 304 that can be deformed is surrounded by the two-dot-and-dash line in FIG. 16. Specifically, the lower portion of the casing 304 which is mounted on the support 302 and the peripheral edges of the recesses 314a, 314b, i.e., those portions outside of the portion surrounded by the two-dot-and-dash line in FIG. 16, are not deformed because of the presence of the base 320 which is molded of a synthetic resin other than the shape memory synthetic resin. Consequently, the casing 304 can reliably be mounted on the support 302, and the buttons 312a, 312b can reliably be mounted in the recesses 314a, 314b.

Inasmuch as the casing 304 is detachable from the support 302, it can be detached from the support 302 and dipped in hot water to change its shape. Accordingly, the process of deforming the casing 304 is facilitated.

Since the deformed casing 304 can automatically return to the originally memorized shape, i.e., the shape shown in FIG. 16, the casing 304 is free of the risk of becoming deformed into a shape other than the desired shape.

Figure 19:
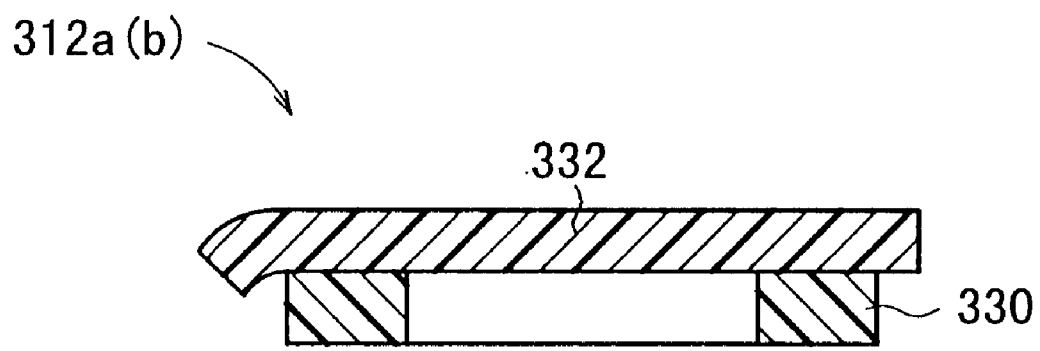
FIG. 19 is a cross-sectional view of a button of the mouse device shown in FIG. 16.

As shown in FIGS. 16 and 19, each of the buttons 312a, 312b comprises a lower base 330 extending around a peripheral edge thereof and an upper plate 332 joined to the lower base 330.

The lower base 330 and the upper plate 332 are integrally molded of different synthetic resin materials by double-shot molding. Particularly, the upper plate 332 is molded of a shape memory synthetic resin. The upper plate 332 can be deformed into a desired shape. Specifically, the left and right buttons 312a, 312b are dipped into hot water at a temperature of 40° C. or higher, and a substantially central portion of the upper plate 332 which is not joined to the lower base 330, i.e., a portion of the upper plate 332 surrounded by the two-dot-and-dash line in FIG. 16, is then deformed into a desired shape. Thereafter, the upper plate 332 is removed from the hot water and cooled to a temperature lower than 40° C., thereby retaining the deformed shape.

Figure 20:
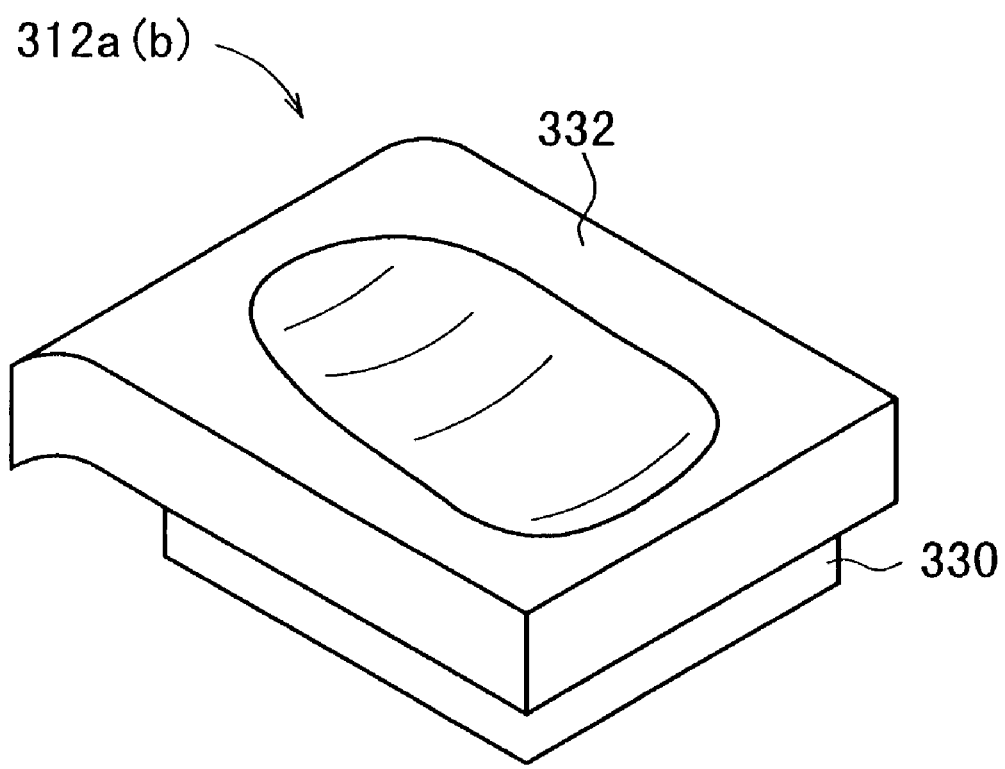
FIG. 20 is a perspective view of the button shown in FIG. 19.

For example, as shown in FIG. 20, the substantially central portion of the upper plate 332, which will be pressed by an index or middle finger of the user when the user uses the mouse device 300, can be deformed into a shape complementary to the finger. The button 312a or 312b with the thus deformed upper plate 332 can easily be operated by the user.

Since the base 330, which is molded of a synthetic resin other than the shape memory synthetic resin, extends along the peripheral edge of each of the buttons 312a, 312b, the peripheral edge of each of the buttons 312a, 312b is not deformed. Therefore, as shown in FIG. 16, the buttons 312a, 312b can reliably be mounted in the recesses 314a, 314b, and can reliably be joined to the switch elements 310a, 310b.

Inasmuch as the buttons 312a, 312b are detachable from the switch units 306a, 306b, they can be detached from the switch units 306a, 306b and dipped in hot water to change their shape. Accordingly, the process of deforming the buttons 312a, 312b is facilitated.

Although certain preferred embodiments of the present invention have been shown and described in detail, it should be understood that various changes and modifications may be made therein without departing from the scope of the appended claims.

What is claimed is:

1. A manual controller connectable to an apparatus and usable as a mouse device in executing a program, said manual controller comprising:

a main body; and a grip detachably mounted to said main body and comprising a portion of a casing of the mouse device, said grip including at least a portion made of a shape memory synthetic resin, said portion being deformable only above a predetermined temperature that is higher than room temperature so as to have a desired outer shape when pressed by a user.

2. A manual controller according to claim 1, wherein said grip has a mounting portion for detachably mounting said grip to said main body, said mounting portion being made of a non-deformable synthetic resin other than said shape memory synthetic resin.

3. A manual controller according to claim 1, wherein said portion of said grip comprises a selected portion to be pressed by a finger of the user, said selected portion being made of said shape memory resin.

4. A manual controller according to claim 1, wherein said grip has a water-resistant structure.

5. A manual controller according to claim 1, wherein said grip comprises a pair of grips of the manual controller.

6. A manual controller for connection to an apparatus for use as a mouse device in executing a program, said manual controller comprising:

a grip, said grip including at least a portion made of a shape memory synthetic resin, said portion being deformable, only above a predetermined temperature that is higher than room temperature, to have a desired outer shape when pressed by a user and wherein said grip comprises a casing of the mouse device; and a main body, said casing being detachably mounted on said main body; and wherein said casing has a mounting portion for detachably mounting said casing to said main body, said mounting portion being made of a synthetic resin other than said shape memory synthetic resin.

7. A manual controller according to claim 6, wherein said portion of said grip comprises a selected portion to be pressed by a finger of the user, said selected portion being made of said shape memory resin.

8. A manual controller according to claim 6, wherein said grip has a water-resistant structure.

9. A manual controller according to claim 6, wherein said grip includes an outer face shell having a base, said outer face shell being made of said shape memory synthetic resin, and said base being made of a synthetic resin other than said shape memory synthetic resin.

* * * * *